United States Patent
Elsey

(10) Patent No.: US 12,397,503 B2
(45) Date of Patent: Aug. 26, 2025

(54) VESSEL FOR RECEIVING A STEREOLITHOGRAPHIC RESIN, A DEVICE AT WHICH A STEREOLITHOGRAPHIC OBJECT IS MADE, A METHOD FOR MAKING A STEREOLITHOGRAPHIC OBJECT AND A METHOD FOR MAKING A VESSEL FOR RECEIVING A STEREOLITHOGRAPHIC RESIN

(71) Applicant: Zydex Pty Ltd, Alexandria (AU)

(72) Inventor: Justin Elsey, Alexandria (AU)

(73) Assignee: Zydex Pty Ltd, Alexandria (AU)

( * ) Notice: Subject to any disclaimer, the term of this patent is extended or adjusted under 35 U.S.C. 154(b) by 301 days.

(21) Appl. No.: 17/437,753

(22) PCT Filed: Mar. 12, 2020

(86) PCT No.: PCT/AU2020/050231
§ 371 (c)(1),
(2) Date: Sep. 9, 2021

(87) PCT Pub. No.: WO2020/181332
PCT Pub. Date: Sep. 17, 2020

(65) Prior Publication Data
US 2022/0161492 A1    May 26, 2022

(30) Foreign Application Priority Data

Mar. 12, 2019 (AU) .................. 2019900819

(51) Int. Cl.
*B29C 64/255* (2017.01)
*B29C 64/124* (2017.01)
(Continued)

(52) U.S. Cl.
CPC .......... *B29C 64/255* (2017.08); *B29C 64/124* (2017.08); *B29C 64/364* (2017.08);
(Continued)

(58) Field of Classification Search
CPC ... B29C 64/124; B29C 64/129; B29C 64/135; B29C 64/25; B29C 64/225;
(Continued)

(56) References Cited

U.S. PATENT DOCUMENTS

2016/0046072 A1* 2/2016 Rolland ................ B29C 64/124
  264/401
2016/0082671 A1* 3/2016 Joyce .................... B29C 64/307
  425/174.4
(Continued)

FOREIGN PATENT DOCUMENTS

WO WO 2018/187709 A1 10/2018
WO WO 2019/217325 A1 11/2019

*Primary Examiner* — JaMel M Nelson
(74) *Attorney, Agent, or Firm* — Christensen, Fonder, Dardi & Herbert PLLC; John P. Fonder

(57) ABSTRACT

A vessel for receiving a stereolithographic resin that includes an oxygen permeable element comprising a stereolithographic resin receiving surface that is an interior vessel surface. The oxygen permeable element comprises at least one marginal surface separate from the stereolithographic resin receiving surface in fluid communication with a gas comprising oxygen for ingress of the oxygen and transport thereof to the stereolithographic resin receiving surface.

15 Claims, 15 Drawing Sheets

(51) Int. Cl.
*B29C 64/364* (2017.01)
*B33Y 10/00* (2015.01)
*B33Y 30/00* (2015.01)
*B33Y 40/00* (2020.01)

(52) U.S. Cl.
CPC ............... *B33Y 10/00* (2014.12); *B33Y 30/00* (2014.12); *B33Y 40/00* (2014.12)

(58) Field of Classification Search
CPC ... B29C 64/364; B29C 64/255; B29C 64/371; B29C 64/145; B33Y 10/00; B33Y 30/00; B33Y 40/00; B33Y 50/00; B33Y 50/02
See application file for complete search history.

(56) References Cited

U.S. PATENT DOCUMENTS

| | | | |
|---|---|---|---|
| 2017/0113417 A1* | 4/2017 | Deotte | B29C 64/124 |
| 2018/0264724 A1* | 9/2018 | Feller | B29C 64/393 |
| 2018/0304526 A1* | 10/2018 | Feller | B33Y 40/20 |
| 2018/0370136 A1 | 12/2018 | Stadlmann | |
| 2020/0094468 A1* | 3/2020 | Feller | B29C 64/124 |
| 2020/0171746 A1* | 6/2020 | Schmidt | B29C 64/245 |

\* cited by examiner

VESSEL FOR RECEIVING A STEREOLITHOGRAPHIC RESIN, A DEVICE AT WHICH A STEREOLITHOGRAPHIC OBJECT IS MADE, A METHOD FOR MAKING A STEREOLITHOGRAPHIC OBJECT AND A METHOD FOR MAKING A VESSEL FOR RECEIVING A STEREOLITHOGRAPHIC RESIN

PRIORITY CLAIM

The present application is a National Phase entry of PCT Application No. PCT/AU2020/050231, filed Mar. 12, 2020, which claims the benefit of Australian Patent Application No. 2019900819, filed Mar. 12, 2019, which are incorporated herein by reference, in their entireties.

FIELD OF THE INVENTION

The present invention generally relates to a vessel for receiving a stereolithographic resin, a device at which a stereolithographic object is made, a method for making a stereolithographic object, and a method for making a vessel for receiving a stereolithographic resin.

BACKGROUND OF THE INVENTION

A three dimensional object can be built up one section at a time (i.e. layer wise). A layer of stereolithographic resin is solidified in the shape of a section of the object. Once the section is formed, another is formed in contact with the previous section. Repetition of this process allows multi-laminate objects in the form of stereolithographic objects to be fabricated. A stereolithographic object made by step-wise layer fabrication may be a rapid prototype, or finished product, for example.

A solidified layer of stereolithographic resin may, however, adhere to a surface on which it is made. A step of detaching the adhered solidified layer of stereolithographic resin from the surface may be required. It may be desirable to prevent the solidified layer of stereolithographic resin being formed adhered to the surface on which it is made, which may increase the rate of fabrication and may reduce separation forces that may otherwise damage the object being formed. Oxygenation of a layer of stereolithographic resin at the surface may prevent solidification of the layer, which may prevent the solidified layer of stereolithographic resin being formed adhered to the surface. Generally, however, the introduction of a stream of pure oxygen has been required for oxygenation of the layer of stereolithographic resin at the surface.

SUMMARY OF INVENTION

Disclosed herein is a vessel for receiving a stereolithographic resin. The vessel comprises an oxygen permeable element comprising a stereolithographic resin receiving surface that is an interior vessel surface. The oxygen permeable element comprises at least one marginal surface separate from the stereolithographic resin receiving surface for fluid communication with a gas comprising oxygen for ingress of the oxygen and transport thereof to the stereolithographic resin receiving surface.

In an embodiment, the at least one marginal surface is in fluid communication with an atmosphere for passive ingress of the oxygen.

In an embodiment, the combined area of the at least one marginal surface is greater than at least one of 0.1%, 1%, 2%, 4%, 8%, 16%, and 32% of the area of the stereolithographic resin receiving surface. The combined area of the at least one marginal surface may be less than at least one of 0.1%, 1%, 2%, 4%, 8%, 16%, and 32% of the area of the stereolithographic resin receiving surface.

In an embodiment, the oxygen permeable element has a thickness greater than at least one of 1 mm, 2 mm, 4 mm, 8 mm, 16 mm, 32 mm, 64 mm and 128 mm. The oxygen permeable element may have a thickness less than at least one of 1 mm, 2 mm, 4 mm, 8 mm, 16 mm, 32 mm, 64 mm and 128 mm.

In an embodiment, the oxygen permeable element has a thickness no less than one hundredth of the square root of the area of the stereolithographic resin receiving surface. The oxygen permeable element may have a thickness no more than one tenth of the square root of the area of the stereolithographic resin receiving surface.

In an embodiment, the oxygen permeable element comprises a semipermeable coating at the stereolithographic resin receiving surface. The semipermeable coating may be permeable to oxygen but not the stereolithographic resin. The semipermeable coating may comprise at least one of an amorphous fluoropolymer, Teflon AF1600, Teflon AF2400, polyphenylene oxide, ethylcellulose, poly(1-trimethylsilyl-1-propyne), polymethylpentene, and poly(4-methyl-2-pentyne).

In an embodiment, the semipermeable coating has a thickness in the range of 0.1 µm to 1000 µm. The semipermeable coating may have a thickness in the range of 1 µm to 20 µm. The semipermeable coating may have a thickness in the range of 5 µm to 10 µm. The semipermeable coating may have an oxygen permeability of no less than one of 10 Barrer, 30 Barrer, 1000 Barrer, 2000 Barrer and 9000 Barrer. The semipermeable coating may have an oxygen permeability of no more than one of 20 Barrer, 50 Barrer, 2000 Barrer, 3000 Barrer and 10 000 Barrer. The oxygen permeable coating may have the structure of an oxygen permeable coating formed by evaporative casting. The oxygen permeable element may comprise a oxygen permeable substrate. The oxygen permeable substrate may have a sheet configuration. The semipermeable coating may be deposited on the oxygen permeable substrate. The oxygen permeable substrate may comprise at least one of polydimethylsiloxane, poly(4-methyl-2-pentyne) and polymethylpentene. The oxygen permeable substrate may have an oxygen permeability of at least 550 barrer. The oxygen permeable substrate may have a Shore A hardness of 10-100 Durometer. The oxygen permeable element may comprise at least one of polydimethylsiloxane, poly(4-methyl-2-pentyne) and polymethylpentene.

In an embodiment, the at least one marginal surface comprises at least one edge surface.

In an embodiment, the oxygen permeable element may be transparent to an actinic radiation for hardening the stereolithographic resin.

In an embodiment, an exterior vessel surface comprises the at least one marginal surface.

In an embodiment, an exterior vessel surface is perforated. The exterior vessel surface may be perforated adjacent the at least one marginal surface. The marginal surface may be in fluid communication with the gas via perforations in the exterior vessel surface. The exterior vessel surface may have a perforation area greater than at least one of 0.1%, 1%, 2%, 4%, 8%, 16%, 32% and 64% of the area of the stereolithographic resin receiving surface. A perforation in the exterior vessel surface may be covered by an oxygen permeable sheet.

In an embodiment, the vessel comprises at least one side wall perforated adjacent the at least one marginal surface.

In an embodiment, the marginal surface comprises an edge surface.

An embodiment comprises a wall supporting the oxygen permeable element. The wall may comprise an actinic radiation transparent material. The actinic radiation transparent material may comprise at least one of a glass, a polymer and poly (methyl methacrylate). The actinic radiation transparent material may have a Young's modulus of 1 GPa to 100 GPa.

Disclosed herein is a device at which a stereolithographic object is made. The device comprises a vessel for receiving a stereolithographic resin in accordance with the above disclosure.

An embodiment comprises a radiation source configured to irradiate the stereolithographic resin receiving area with a radiation The radiation source may be a light source. The radiation may be an actinic light.

An embodiment comprises a radiation manipulator configured to manipulate the radiation. The radiation manipulator may impart a spatial feature to the radiation. The radiation manipulator may impart a temporal feature to the radiation. The shape of each section formed may thus be individually controlled by the action of the radiation manipulator on the light.

In the context of this specification, a section is to be understood to encompass a slice of the stereolithographic object. A planar section encompasses a portion of the stereolithographic object located between two parallel planes that intersect the stereolithographic object. Generally, but not necessarily, the sections formed are planar sections.

In an embodiment, the radiation manipulator is configured to scan the radiation relative to the surface.

Disclosed herein is a method for making a stereolithographic object. The method comprises the step of disposing a stereolithographic resin on a stereolithographic resin receiving surface of an oxygen permeable element The oxygen permeable element comprises at least one marginal surface separate from the stereolithographic resin receiving surface. The at least one marginal surface is in fluid communication with a source of oxygen for ingress of oxygen and transport thereof. The method comprises forming a layer of oxygenated stereolithography resin in contact with the stereolithographic resin receiving surface by the transport of the oxygen. The method comprises the step of irradiating the stereolithographic resin so disposed with an actinic radiation to selectively harden a layer of stereolithographic resin adjacent the layer of oxygenated stereolithographic resin. The method comprises the step of separating the selectively hardened layer of stereolithographic resin and the layer of oxygenated stereolithographic resin.

In an embodiment, the at least one marginal surface is in fluid communication with atmosphere for passive ingress of atmospheric oxygen. Forming the layer of oxygenated stereolithography resin may comprise transport of the atmospheric oxygen.

In an embodiment, the vessel is in accordance with the above disclosure.

In an embodiment, the layer of selectively hardened stereolithographic resin constitutes a section.

Disclosed herein is a method for making a vessel for receiving a stereolithographic resin. The method comprises the step of forming within a vessel scaffold an oxygen permeable element comprising a stereolithographic resin receiving surface that is an interior vessel surface. The oxygen permeable element comprises at least one marginal surface separate from the stereolithographic resin receiving surface. The at least one marginal surface is for passive ingress of oxygen and transport thereof to the stereolithographic resin receiving surface.

In an embodiment the step of forming within the vessel scaffold the oxygen permeable element comprises the step of forming an oxygen permeable substrate in the vessel shell. The step of forming within the vessel shell the oxygen permeable element may comprise forming a semipermeable coating on a surface of the oxygen permeable substrate.

In an embodiment, the vessel is in accordance with the above disclosure.

The stereolithographic object may be fabricated by sequentially irradiating each of a plurality of layers of stereolithographic resin to form respective sections. Each section may be an entire section of the stereolithographic object. Each section may be formed spaced apart from the stereolithographic resin receiving surface by an oxygenated layer of stereolithographic resin. Each entire section may comprise an entire planar section.

Irradiation may also attach the solidified material to the stereolithographic object being made.

Especially delicate stereolithographic objects may be made that may not be made using another approach.

Were possible, any one or more features of above disclosure may be combined with any one or more features of the above disclosure as is suitable.

BRIEF DESCRIPTION OF THE FIGURES

In order to achieve a better understanding of the nature of the present invention, embodiments will now be described, by way of example only, with reference to the accompanying figures in which.

DETAILED DESCRIPTION OF EMBODIMENTS OF THE INVENTION

Figure 1:
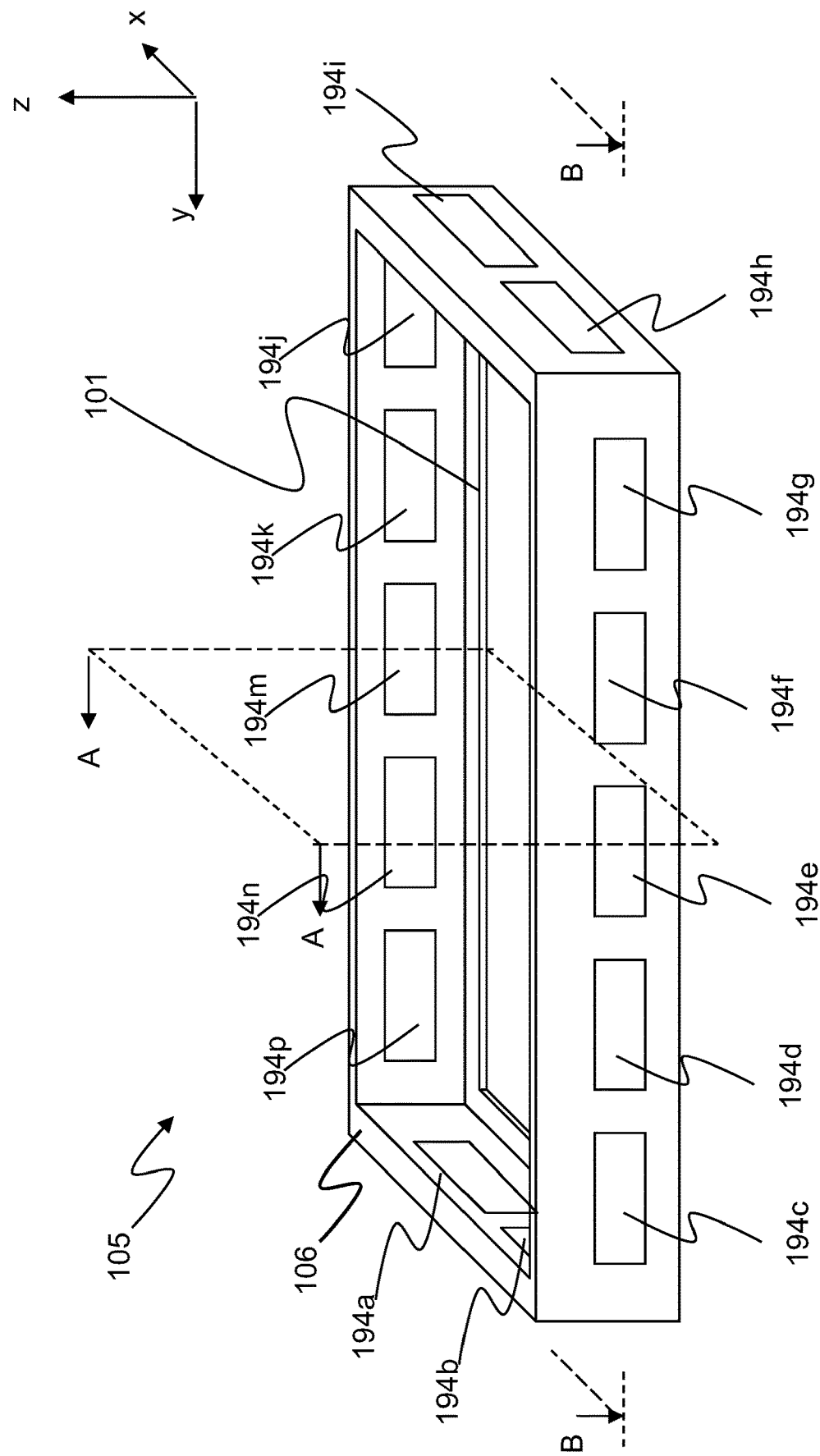
FIG. 1 shows an orthographic view of one example of a vessel scaffold of an embodiment of a vessel for receiving a stereolithographic resin for making a stereolithographic object.

FIG. 1 shows an example of a vessel scaffold generally indicated by numeral 105 in the form of a frame or shell, the vessel scaffold 1-5 being for a vessel 100 for receiving a stereolithographic resin 104. An object in the form of a stereolithographic object can be made at the vessel 100. The vessel scaffold 105 comprises at least one perimeter exterior wall 106 with perforations in the form of gas ports 194a-194p ("194") cut through the wall 106. The gas ports 194 may be covered with an oxygen permeable sheet, for example a mesh, paper or generally any suitable oxygen permeable membrane as suitable or desired.

Figure 2:
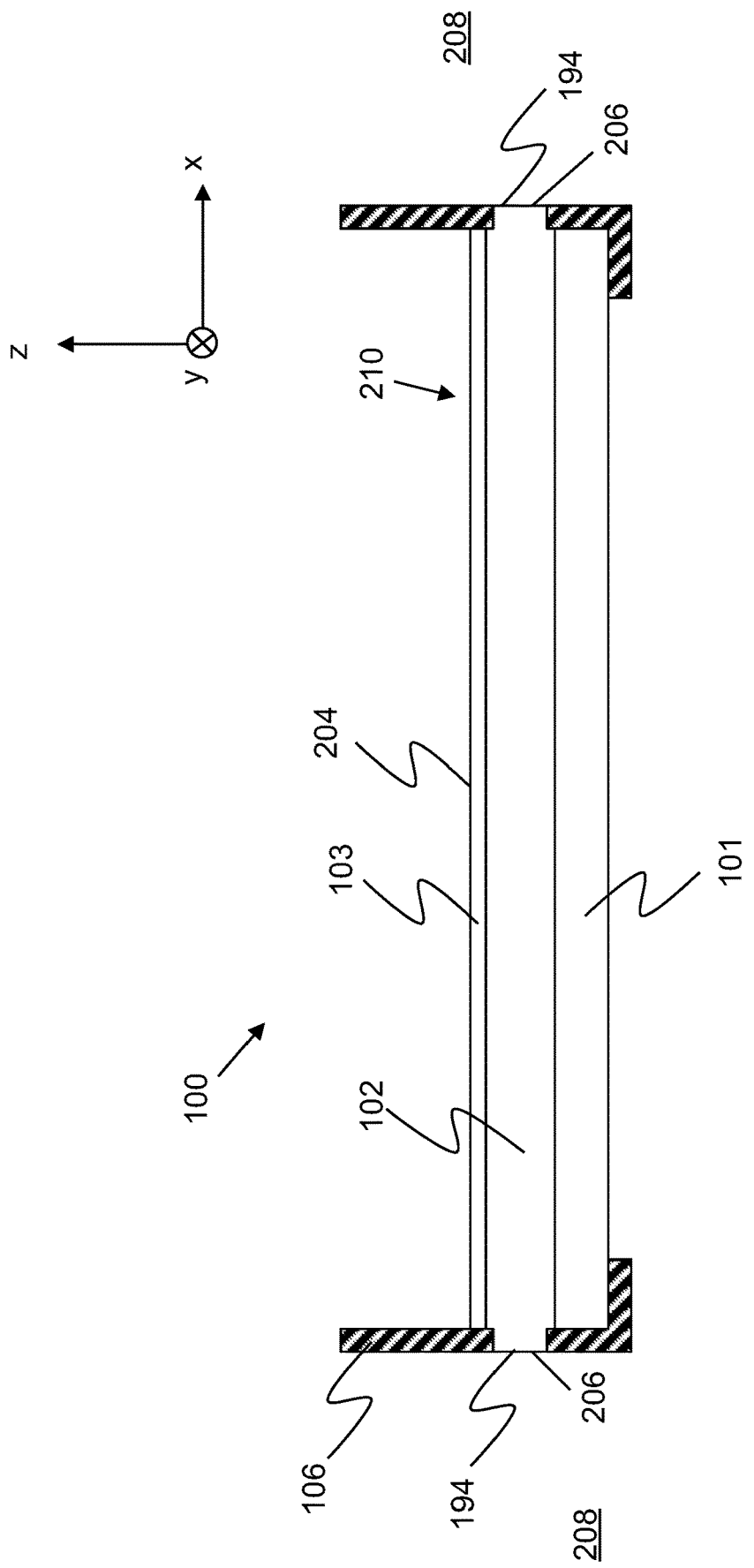
FIG. 2 shows a section through an embodiment of the vessel comprising the vessel scaffold of FIG. 1.

FIG. 2 shows a section through the vessel 100, the section corresponding to section A-A indicated in FIG. 1. The vessel 100 comprises a vessel wall 101 in the form of a structural member. In this embodiment, the vessel wall is a vessel bottom wall 101, however in alternative embodiments it may be a top wall or side wall, for example. The vessel 100 comprises an oxygen permeable element 210, which has substantially a rectangular prism or sheet configuration. The oxygen permeable element 210 comprises a stereolithographic resin receiving surface 204 that is an interior bottom vessel surface, however it may for example be an interior side vessel surface. In the context of the present document, an interior vessel surface is a surface of a vessel 100 that is substantially or entirely associated with the inside of the vessel 100. The oxygen permeable element 210 comprises at least one marginal surface 206 in the form of an edge surface at the exterior of the vessel and which is separate from the stereolithographic resin receiving surface 204. The marginal surface 206 is in fluid communication with a source of oxygen in the form of atmosphere 208 for passive ingress of atmospheric oxygen and transport thereof to the stereolithographic resin receiving surface 204. In the context of the present document, atmosphere 208 is the gas enveloping the vessel 100 (or device comprising the vessel), and which comprises oxygen ("atmospheric oxygen"). An example of a suitable atmosphere includes the earth's atmosphere or air taken from the earth's atmosphere, which comprises approximately 21% oxygen. In alternative embodiments, the marginal surface may be on the same face as the stereolithographic resin receiving surface 204, or on the underside, such as surface 213 of FIG. 15.

In this but not necessarily in all embodiments, the oxygen permeable element 210 comprises a semipermeable coating 103 and a oxygen permeable substrate 102. The oxygen permeable element 210 is a laminate, however an alternative embodiment may be without a coating and have a homogenous structure and/or composition. In the context of the present application, "semipermeable" encompasses selectively permeable. The semipermeable coating 103 is permeable to oxygen but not the stereolithographic resin. Vessel bottom wall 101, and the oxygen permeable element 210 are transparent to actinic radiation in the form of actinic light used in the stereolithographic process to harden stereolithographic resin received on the stereolithographic resin receiving surface 204. Other embodiments may not comprise semipermeable coating 103.

Vessel bottom wall 101 provides rigidity and mechanical support for the oxygen permeable element 210. In the present embodiment, the vessel bottom wall 101 comprises a plate of an actinic radiation transparent material in the form of fused silica. The plate 101 is 6 mm thick, however it may have a lesser or greater thickness as suitable. The vessel bottom wall 101 may alternatively or additionally comprise B270 glass, a polymer such as polycarbonate, Perspex, PET or generally any suitable material. The thickness of vessel bottom wall 101 may be between 1 mm and 100 mm, for example, depending on the strength required by the apparatus, but other thicknesses may be suitable. The actinic radiation transparent material has a Young's modulus of 1 GPa to 100 GPa, although it may be greater or lesser in other embodiments.

Oxygen permeable element 210 permits passive transport of ambient oxygen from outside the vessel 100 via gas ports 194 at which the at least one marginal surface 206 is disposed.

In the present embodiment, oxygen permeable substrate 102 is a 7 mm thick layer of platinum cured polydimethylsiloxane, such as Sylgard 184 or Elastosil RT601, however other suitable substrates materials of other thicknesses may be used. Vessel 100 was constructed by the applicant and has dimensions 170 mm×100 mm×6 mm (XYZ) with 12 gas ports 194 each of area 180 mm$^2$ (30 mm×6 mm) comprising a 6 mm thick vessel wall 101 comprising a plate of low-iron glass on which the substrate 102 and a 10 µm layer of Teflon AF2400 was cast. Other dimensions and materials may be used.

The substrate 102 is cast directly into the frame 106 onto the vessel bottom wall 101. The oxygen permeable substrate 102 has a Shore A hardness of 10-100 Durometer, but other suitable harnesses may be used. Polydimethylsiloxane has a high oxygen permeability of around 600 Barrer. In other embodiments, the oxygen permeable substrate 102 may have generally any suitable oxygen permeability in accordance with the application. In alternative embodiments the thickness of the oxygen permeable element may be between 1 mm and 128 mm, however in some embodiments greater or lesser thickness may be used as appropriate, depending, for example, on the area of the vessel 100 in the XY plane. Larger areas may require higher fluence of oxygen into the vessel necessitating a greater thickness of oxygen permeable substrate 102.

The oxygen permeable coating 103 generally prevents the stereolithography resin or its substituent ingredients from diffusing into the substrate 102, impairing its oxygen permeability or optical clarity. Oxygen permeable coating 103 is optional, however it may extend the working life of the vessel 100. In the present embodiment, the oxygen permeable coating 103 comprises a 10 µm thick layer of amorphous fluoropolymer such as Teflon AF2400 or Teflon AF1600. The thickness of the coating 103 may be, for example, between 0.1 µm and 1000 µm in some embodiments, and 5 µm to 10 µm in other embodiments. Teflon AF2400 has a relatively high oxygen permeability of 1300 Barrer. The coating 103 is in the present but not all embodiments cast directly onto the top surface of substrate 102. The Teflon AF2400 is dissolved in a suitable fluorinated solvent such as Fluorinert FC-40 from 3M or Galden HT-135 from Solvay Solexis to form a solute, then evaporating the solvent component of the solute to form the film coating 103. Alternatively, a pre-made film of Teflon AF2400 or Teflon AF1600 may be bonded to the oxygen permeable substrate 102 using a polydimethylsiloxane or other adhesive. Alternative films for the oxygen permeable coating 103 include polymethylpentene (oxygen permeability 37 Barrer), polyphenylene oxide (Oxygen permeability 17 Barrer), ethylcellulose (oxygen permeability 11 Barrer), poly(1-trimethylsilyl-1-propyne) (oxygen permeability 9700 Barrer), or poly (4-methyl-2-pentyne) (oxygen permeability 2700 Barrer). A thinner layer of lower permeability film may provide a similar rate of oxygen transport to a thicker layer of a higher permeability film. The semipermeable coating 103 generally has an oxygen permeability of no less than one of 10 Barrer, 30 Barrer, 1000 Barrer, 2000 Barrer and 9000 Barrer. The semipermeable coating 103 has an oxygen permeability of generally no more than one of 20 Barrer, 50 Barrer, 2000

Barrer, 3000 Barrer and 10 000 Barrer. Other oxygen permeabilities may be used as suitable.

Figure 14:
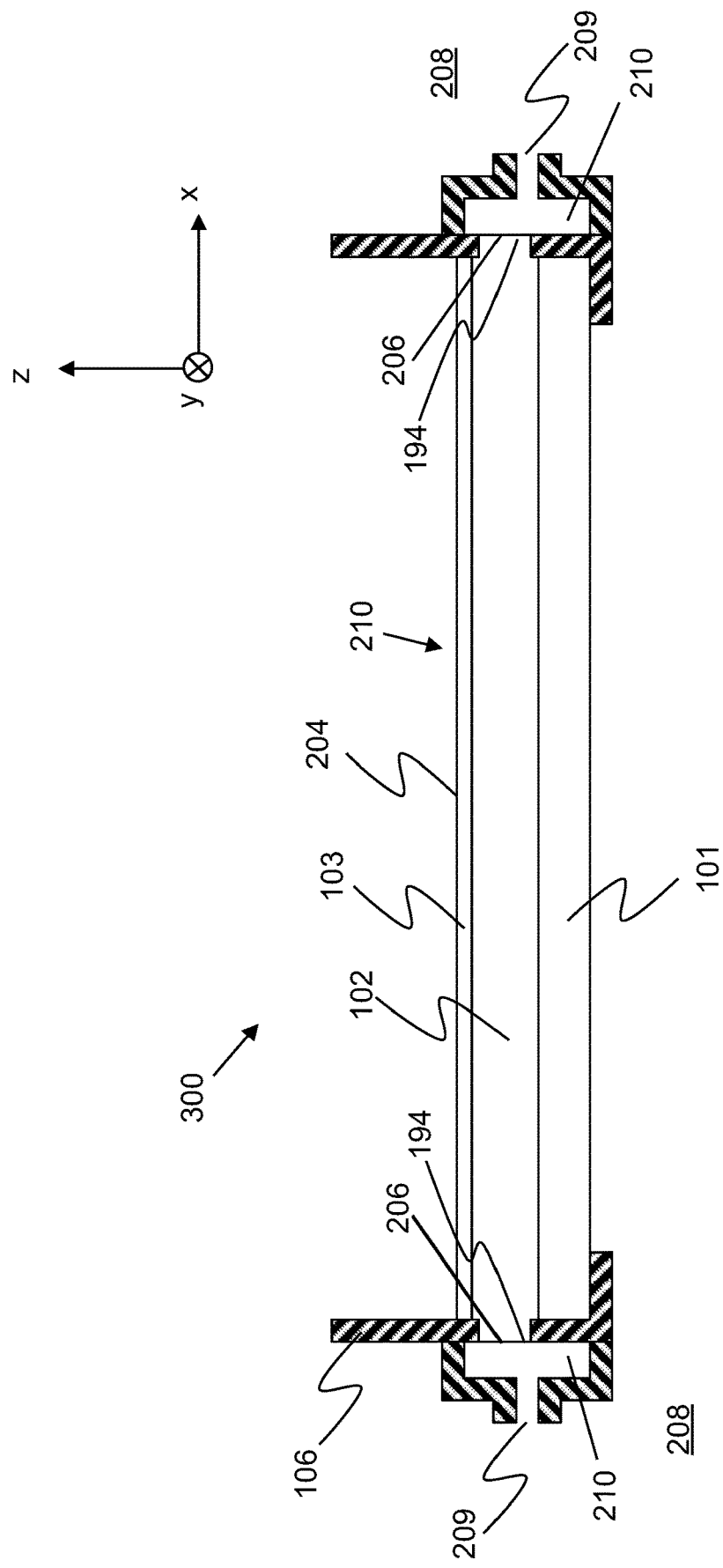
FIGS. 14 and 15 show sections through alternative embodiments of a vessel for receiving a stereolithographic resin for making a stereolithographic object.

FIG. 14 shows a section through another embodiment of a vessel 300 for receiving a stereolithographic resin for making a stereolithographic object, where parts that are similar or identical in form and/or function to those in FIGS. 1 and 2 are similarly numbered. In this embodiment, the gas port 194 comprises a conduit coupling 209 in the form of a threaded gas hose connector, or alternatively a nipple fitting or generally any suitable conduit coupling, for communicating oxygen from a supply of oxygen to the vessel 300. The gas port 194 defines a chamber in the form of a pressure chamber. Pressurised gas in form of compressed air, a gas with a concentration of oxygen greater than that of earth's atmosphere, or pure oxygen, for example, may be supplied by a hose connected to the conduit coupling 209, for example. The hose communicates the gaseous output from an oxygen concentrator, however other oxygen sources may be used. For example, a pressurized oxygen cylinder may be connected to the gas port 194 via the gas hose to supply oxygen.

Figure 15:
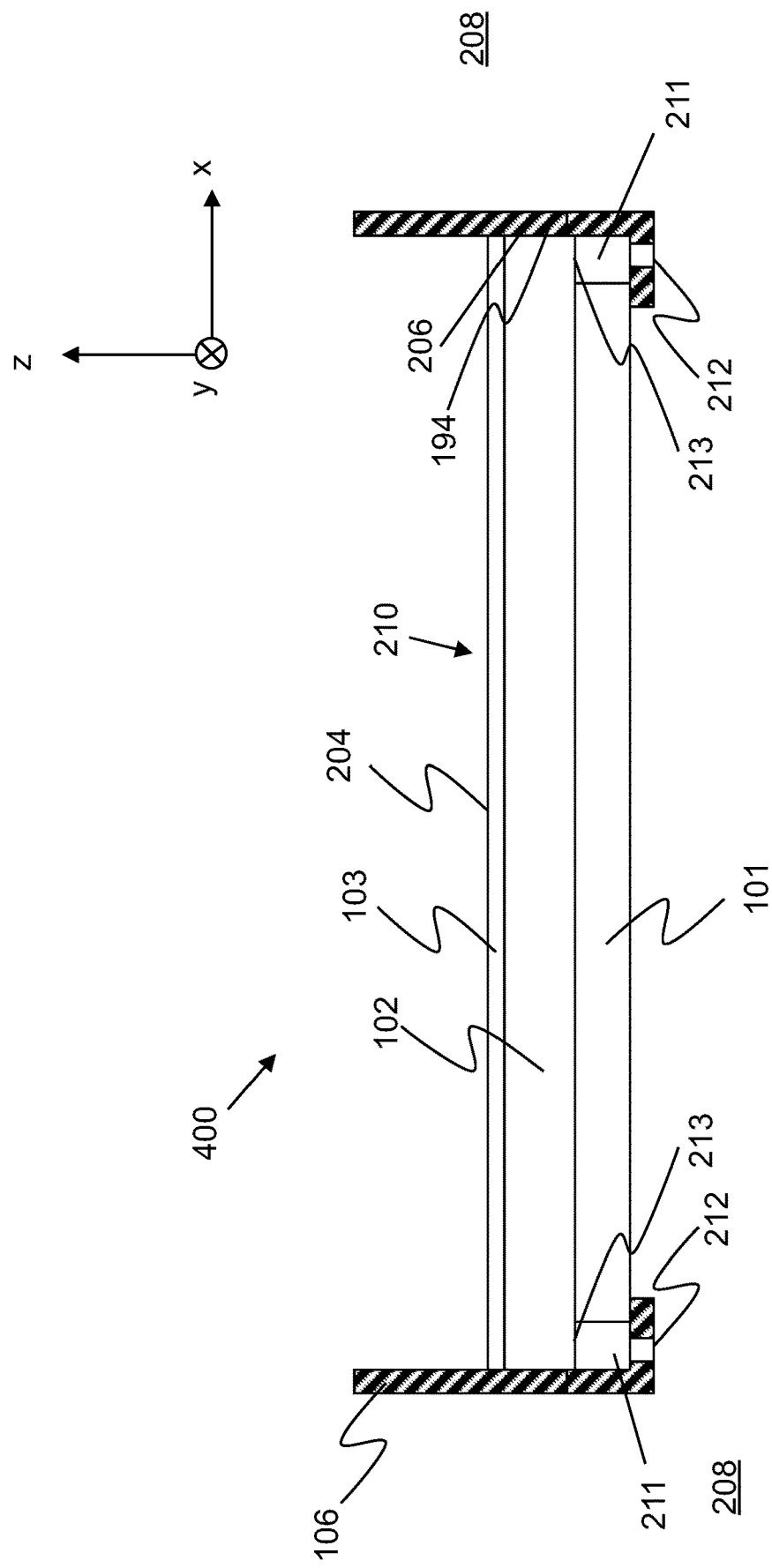

FIG. 15 shows a section through another embodiment of a vessel 400 for receiving a stereolithographic resin for making a stereolithographic object, where parts that are similar or identical in form and/or function to those in FIGS. 1 and 2 are similarly numbered. In this embodiment, the gas port 212 comprises a conduit coupling in the form of a threaded gas hose connector, or alternatively a nipple fitting or generally any suitable conduit coupling, for communicating oxygen from a supply of oxygen to the vessel 400. The gas port 212 couples to a chamber 211 in the form of a pressure chamber, which allows supply of gas to the lower surface 213 of oxygen permeable substrate 102. Pressurised gas in form of compressed air, a gas with a concentration of oxygen greater than that of earth's atmosphere, or pure oxygen, for example, may be supplied by a hose connected to the gas port 212, for example. The hose communicates the gaseous output from an oxygen concentrator, however other oxygen sources may be used. For example, a pressurized oxygen cylinder may be connected to the gas port 212 via the gas hose to supply oxygen to the oxygen permeable substrate 102.

Figure 3:
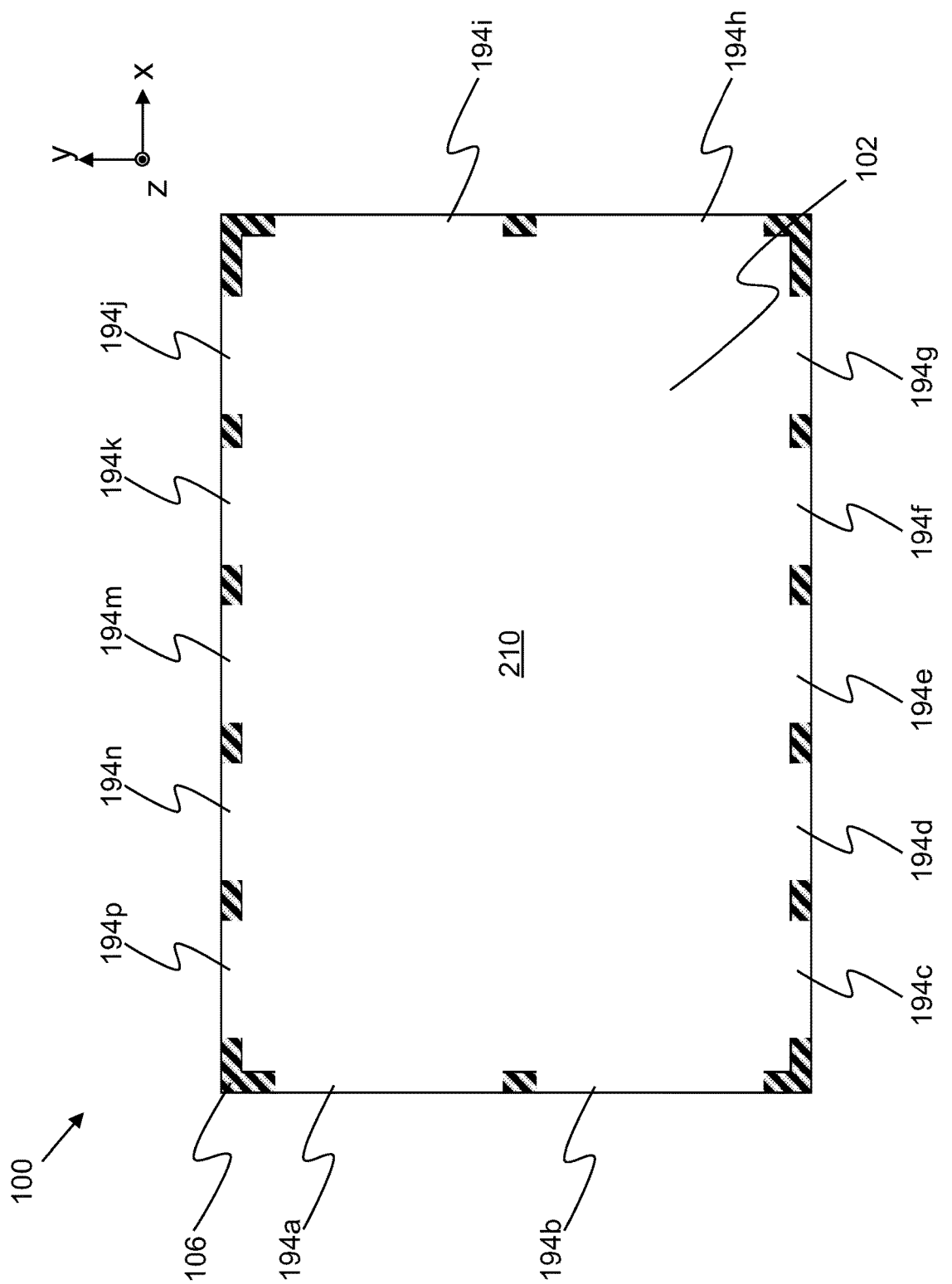
FIG. 3 shows another section through the embodiment of the vessel of FIG. 2.

FIG. 3 shows another section through the vessel 100 of FIG. 2, the section corresponding to section B-B indicated in FIG. 1. FIG. 3 illustrates the ratio of the area of the gas ports 194 to the area of the perimeter wall of vessel 100. The gas ports 194 occupy the majority of the outer surface of the perimeter of the vessel 100 in the XY section occupied by the oxygen permeable element 210. The perimeter wall 106 area is generally but not necessarily reduced to improve atmospheric oxygen flow through the gas ports 194 while maintaining the structural integrity of the wall. This arrangement presents a significant portion of the oxygen permeable element 210 to the ambient atmosphere (generally "air") to encourage the flux of oxygen from outside the perimeter of the vessel to its center.

Figure 4:
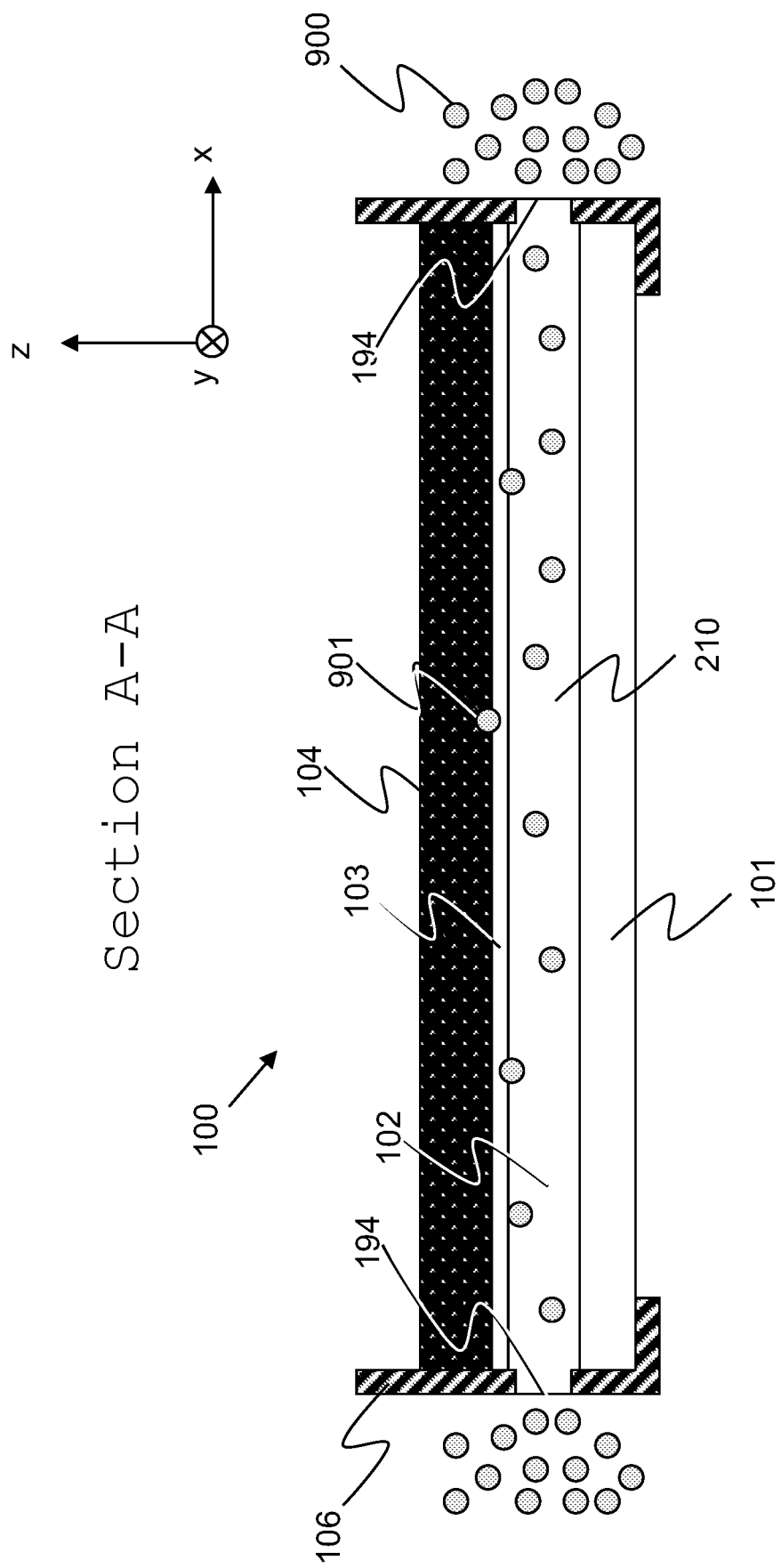
FIG. 4 shows the section through the embodiment of the vessel of FIG. 2 having received therein stereolithographic resin and illustrating the transport of atmospheric oxygen to the stereolithographic resin.

FIG. 4 shows another schematic diagram of the vessel shown in FIG. 2, having received stereolithographic resin 104. In FIG. 4, atmospheric oxygen, indicated generally by the numeral 900, diffuses into the oxygen permeable element 210 via the gas ports 194. The relative concentration of oxygen is conveyed graphically by the spacing of the illustrated particles. At the edge of the oxygen permeable element the concentration of oxygen particles is that of ambient atmospheric concentration, generally at substantially 1 atmosphere of pressure. In the present embodiment, there is no mechanical air or oxygen feed system to pressurize or artificially concentrate the oxygen particles or force them by contrived means of pressure or concentration gradient into the oxygen permeable element 210. The diffusion process is an example of a passive process, in that it requires no externally applied motivation. Some oxygen molecules, such as that indicated by the numeral 901, diffuse through the oxygen permeable member 210 and into the stereolithographic resin 104 received by the stereolithographic resin receiving surface 204. The thickness of the oxygen permeable element 210 in the z-direction is generally but not necessarily selected with consideration of the area of stereolithographic resin receiving surface 204. The greater the area of the stereolithographic resin receiving surface 204, the thicker the element 210 may be. Trial and error experiments can be performed to determine whether the thickness is sufficient to form an oxygenated layer of stereolithographic resin that resists photohardening, in which progressively thicker elements 210 can be used. The oxygen permeable element 210 has a thickness greater than at least one of 1 mm, 2 mm, 4 mm, 8 mm, 16 mm, 32 mm, 64 mm and 128 mm. The oxygen permeable element 210 has a thickness less than at least one of 1 mm, 2 mm, 4 mm, 8 mm, 16 mm, 32 mm, 64 mm and 128 mm. Other thicknesses may be used as suitable and desired. The oxygen permeable element 210 generally but not necessarily has a thickness no less than one hundredth of the square root of the area of the stereolithographic resin receiving surface 204, and no more than one tenth of the square root of the area of the stereolithographic resin receiving surface 204, to enable sufficient oxygen diffusion.

The combined area of the at least one marginal surface 206 is generally but not necessarily greater than at least one of 0.1%, 1%, 2%, 4%, 8%, 16%, 32%, and 100% of the area of the stereolithographic resin receiving surface 204. The combined area of the marginal surface generally but not necessarily is less than at least one of 0.1%, 1%, 2%, 4%, 8%, 16%, 32% and 1000% of the area of the stereolithographic resin receiving surface 204.

The exterior vessel surface generally but not necessarily has a perforation area (that is, the combined area of all the gas ports 194) that is greater than at least one of 0.1%, 1%, 2%, 4%, 8%, 16%, 32% and 64% of the area of the stereolithographic resin receiving surface 204.

The dimension of the gas ports 194 in the z-direction can be chosen to be substantially the thickness of the oxygen permeable element 210, to expose substantially all of the area to ambient atmosphere without the stereolithographic resin 104 leaking out of a gas port 194. The concentration of oxygen in the stereolithographic resin 104 is highest at the stereolithographic resin receiving surface 204.

FIGS. 5 to 9 show schematic views of one embodiment of an apparatus for making a stereolithographic object, the apparatus being generally indicated by the numeral 200. The figures taken in sequence illustrate steps of an embodiment of a method for making a stereolithographic object utilizing vessel 100. Coordinate axes are shown in the figures where x and y are horizontally orientated and z is vertically orientated.

Apparatus 200 provides vessel 100 with photolithographic resin receiving surface 204 on which a layer of stereolithographic resin 104 can be disposed. In the context of the present document, a stereolithographic resin is a liquid that hardens when exposed to a radiation, examples of which include but are not not limited to visible and invisible light in the form of ultraviolet light, for example. A light that is capable of curing a stereolithographic resin is known as actinic light. Examples of actinic light include spectral components having a wavelength of, for example, 355 nm, 385 nm, and 405 nm. In some embodiments, radiation sources other than light may be used. For example, the radiation source may be ionizing or non-ionizing radiation.

An example of a stereolithographic resin 104 that may be suitable for at least some applications may comprise a mixture of acrylate and methacrylate monomers and oligomers, photoinitiators, pigments, dyes and stabilizers such that the mixture polymerizes when exposed to suitable light. Example stereolithographic resins include but are not limited to Freeprint Ortho UV from Detax, Germany, and KZ-1860-CL from Allied PhotoPolymers, USA. Acrylate and methacrylate polymerization is inhibited by the presence of oxygen as it neutralizes free radicals which propagate the polymerization reaction. The degree of inhibition is dependent on factors including the oxygen concentration, photoinitiator concentration, monomer chemistry and molecular weight. Other photocurable materials that are inhibited by oxygen may be used as suitable, an example of which is acrylamide functionalized monomers.

The vessel 100 is in the form of a shallow trough or dish for containing the stereolithographic resin 104. The vessel 100 may have a volume sufficient to hold enough stereolithographic resin 104 to build an entire object without being replenished. Optionally, a conduit may connect the vessel 100 and a supply of the stereolithographic resin 104 to replenish the stereolithographic resin 104 as it is consumed. The oxygen permeable coating 103 forms the innermost layer of the bottom of the vessel 100. The vessel 100 and contained stereolithographic resin 104 104 can be removed from the apparatus and replaced with another vessel 100, thus providing means for replacing damaged vessels or making objects from different stereolithographic resins 104. The present vessel 100 may have significantly greater utility than a comparable apparatus having oxygen feed components such as nozzles, o-rings and seals for connecting and disconnecting pure or compressed oxygen feed lines to the vessel 100.

The embodiment of FIGS. 5 to 7 and 9 is configured such that in use the vessel 100 is horizontally orientated. The device 200 may, for example, have a chassis 130 with attached feet 132, 133 configured to support the chassis above a surface such as a bench, and the vessel 100 is mounted relative to the chassis so that when the chassis is so supported the base of the vessel 100 has a horizontal orientation. In other embodiments, the stereolithographic resin receiving surface 204 may be inclined at up to 45 degrees to the horizontal (that is, the surface is upwardly facing), provided that the vessel walls are sufficiently high to contain the resin 104. Mounting brackets 152, 154, 156, 158 may be used to ensure that apparatus components are maintained in their correct position and orientation relative to the chassis. Clamps 196, 197 hold the vessel 100 against a mounting platform 510 that secures the vessel 100 against forces which may alter its position, and may serve to mount apparatus components and form a fluid-tight division between the upper and lower regions of the apparatus to prevent ingress of any spilled photohardenable fluid 104 which could damage delicate components.

Figure 10:
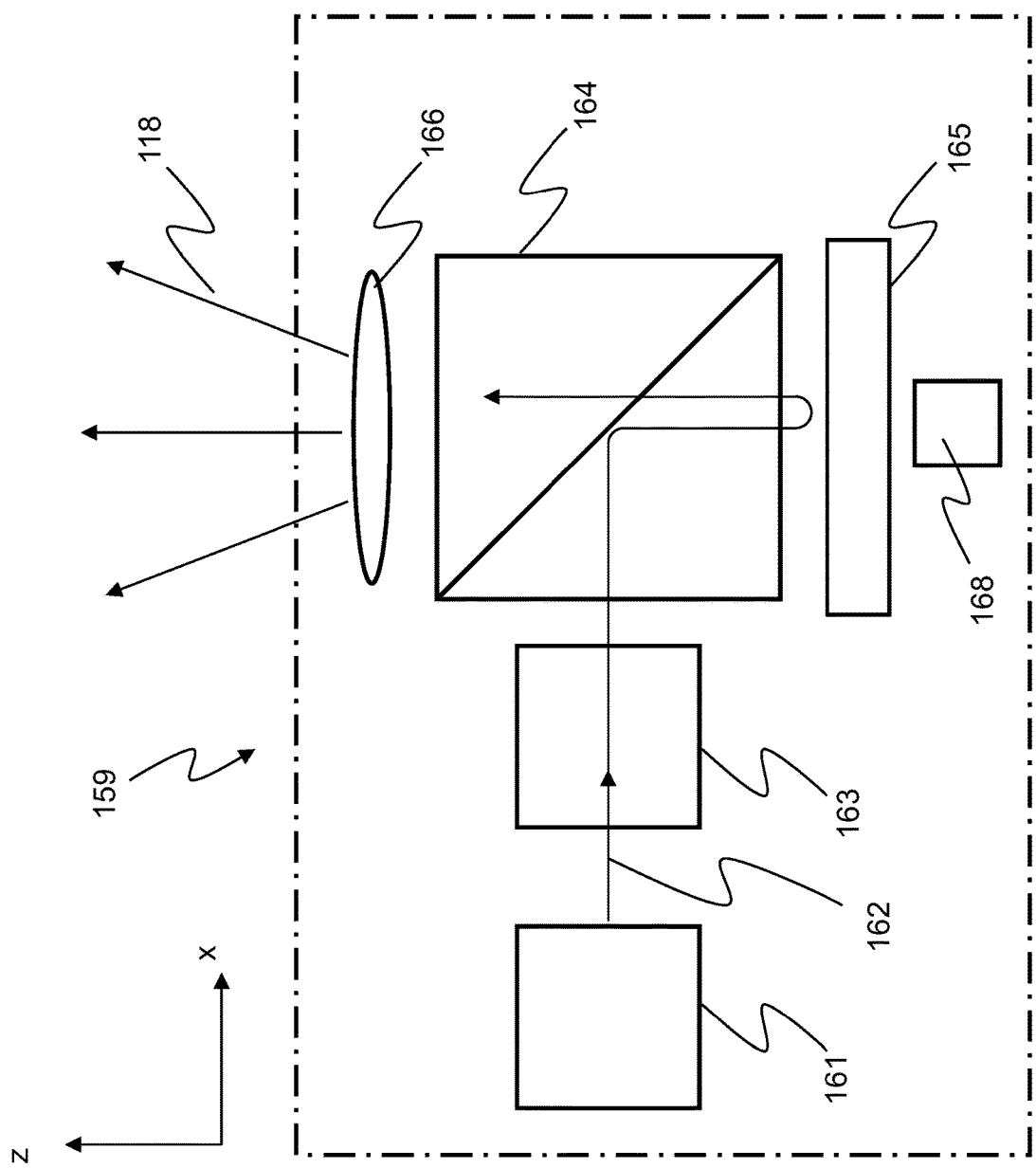
FIGS. 10 to 12 show schematic views of example radiation sources that may form part of a device for making a stereolithographic object of FIGS. 5 to 7 and 9.
Figure 11:
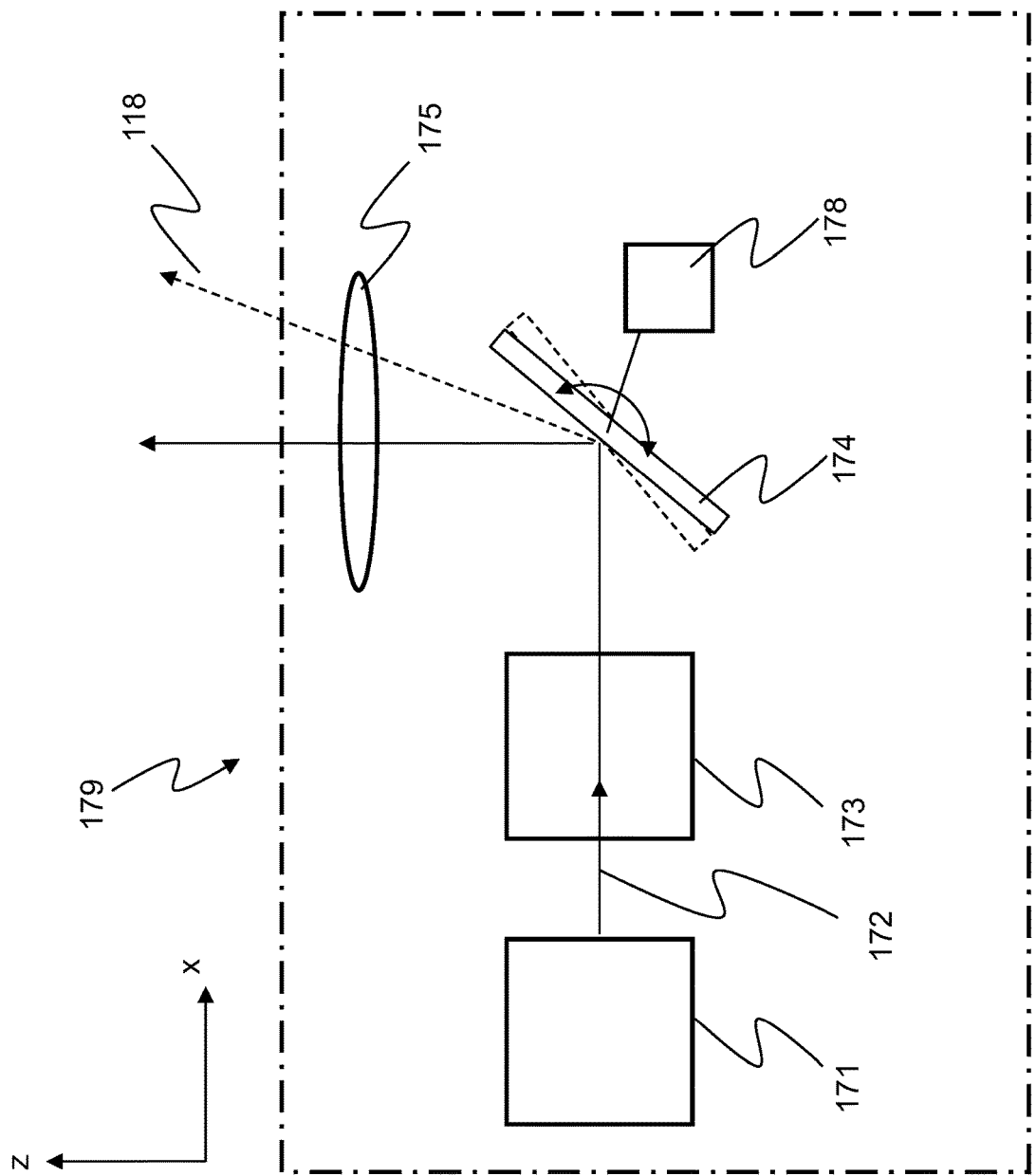
Figure 12:
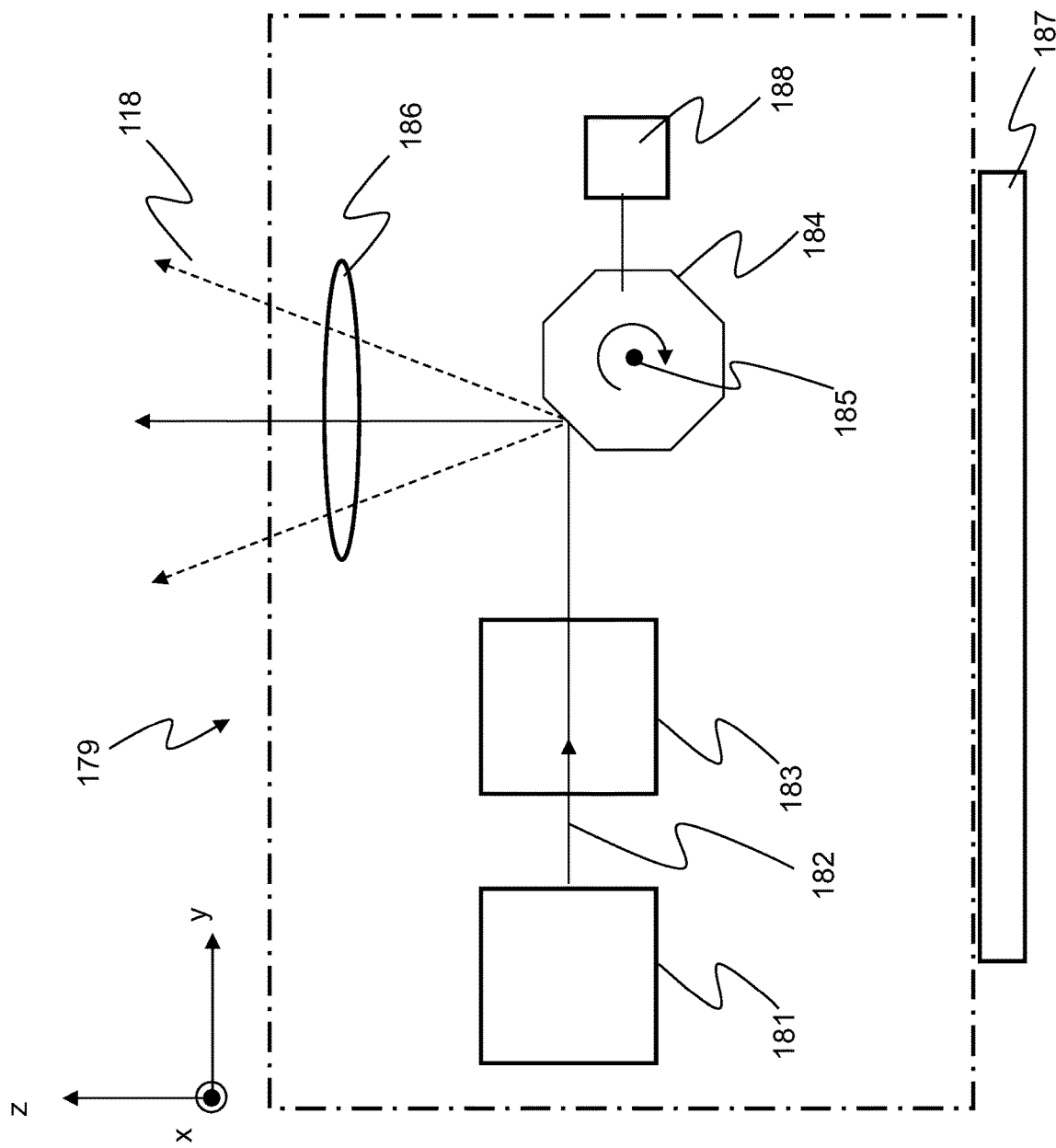

A radiation source in the form of a light source 116 may be activated so that it emits spatially and/or structured light 118 capable of selectively hardening areas of the stereolithographic resin 104 to form a section of the stereolithographic object. Light source 116 may, for example, incorporate a light manipulator such as an image projection system depicted in FIG. 10 and generally indicated with the numeral 159, comprising light source 116 emitting light 162, relay optics 163, turning prism 164, spatial light modulator 165 controllable by controller 168, and projection lens 166. Alternatively, light source 116 may be a light beam scanning apparatus depicted in FIG. 11 and generally indicated by the numeral 179, comprising a laser source 171 emitting light 172 of wavelength of around 350 nm, for example, collimating and/or focusing optics 173, scanning mirror 174 whose rotation is controllable in one or more axes by mirror controller 178, optionally a second controllable mirror not shown in the figure, and optionally a projection lens 175 such as an F-Theta lens. Controller 178 can be configured to scan the mirror 174 (coordinated with a second mirror, if present) in a raster scanning mode, or alternatively in a vector scanning mode. FIG. 12 shows a second type of beam scanning apparatus generally indicated by the numeral 179 comprising a laser source 181 emitting light 182, collimating and/or focusing optics 183, polygon mirror 184 rotatable around an axis 185 and controllable by controller 188, and optionally a projection lens 186 such as an F-Theta lens. As the apparatus of 179 may only scan light in the y-axis according to the coordinate system shown in FIG. 12, the apparatus resides on a translation stage 187 which can move the apparatus in the x-direction, enabling the projected light to address locations in the x and y dimensions. The translation stage may comprise any one or more of linear motors, drive belts, stepper motors, rack and pinion arrangements, for example, or generally any suitable components arranged to provide translation. Apparatus 179 is suitable for operating in a raster scanning mode. The light source may, in some embodiments, comprise an incandescent light or light emitting diode, for example. Any suitable light source may be used.

Referring again to FIGS. 5 to 9, a positioner 120 capable of linear motion along the z-direction is coupled to and moves a platform 121 in the form of an inverted platform on which the stereolithographic object 122 being made is mounted. The positioner 120 positions the object being made 122 relative to the upwardly facing surface 103 of the vessel 100. The positioner may comprise any one or more of linear motors, drive belts, stepper motors, rack and pinion arrangements, for example, or generally any suitable components arranged to provide linear motion.

Figure 5:
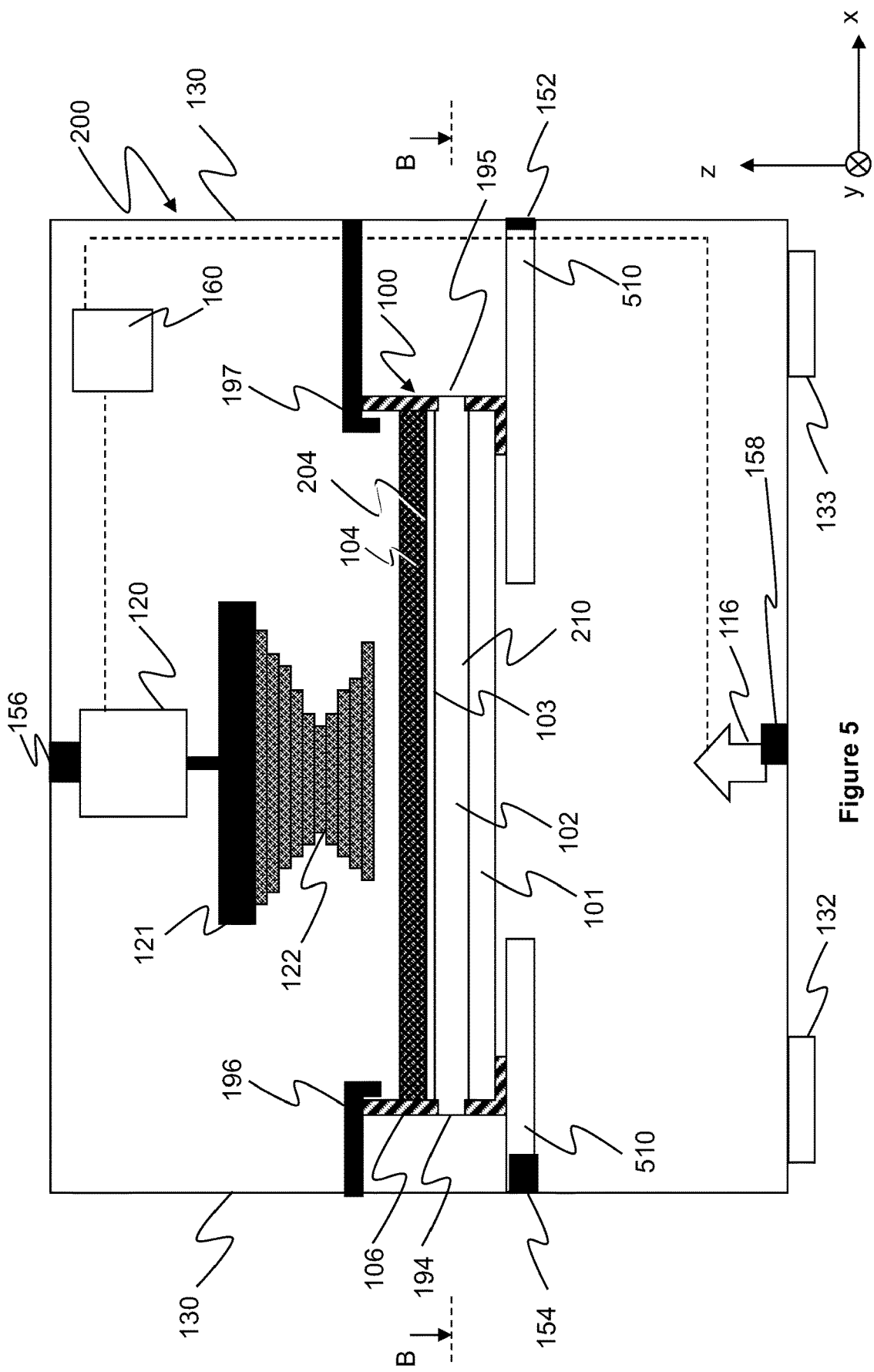
FIGS. 5 to 7 and 9 show schematic elevation views of an embodiment of a device making a stereolithographic object, and illustrate steps of an embodiment of a method for making a stereolithographic object.

A sequence of actions can be performed with the apparatus 200 to form a new section of the stereolithographic object being made 122. The process begins as shown in FIG. 5, with the previous sections of the object under fabrication 122 spaced apart from the surface 204.

Figure 6:
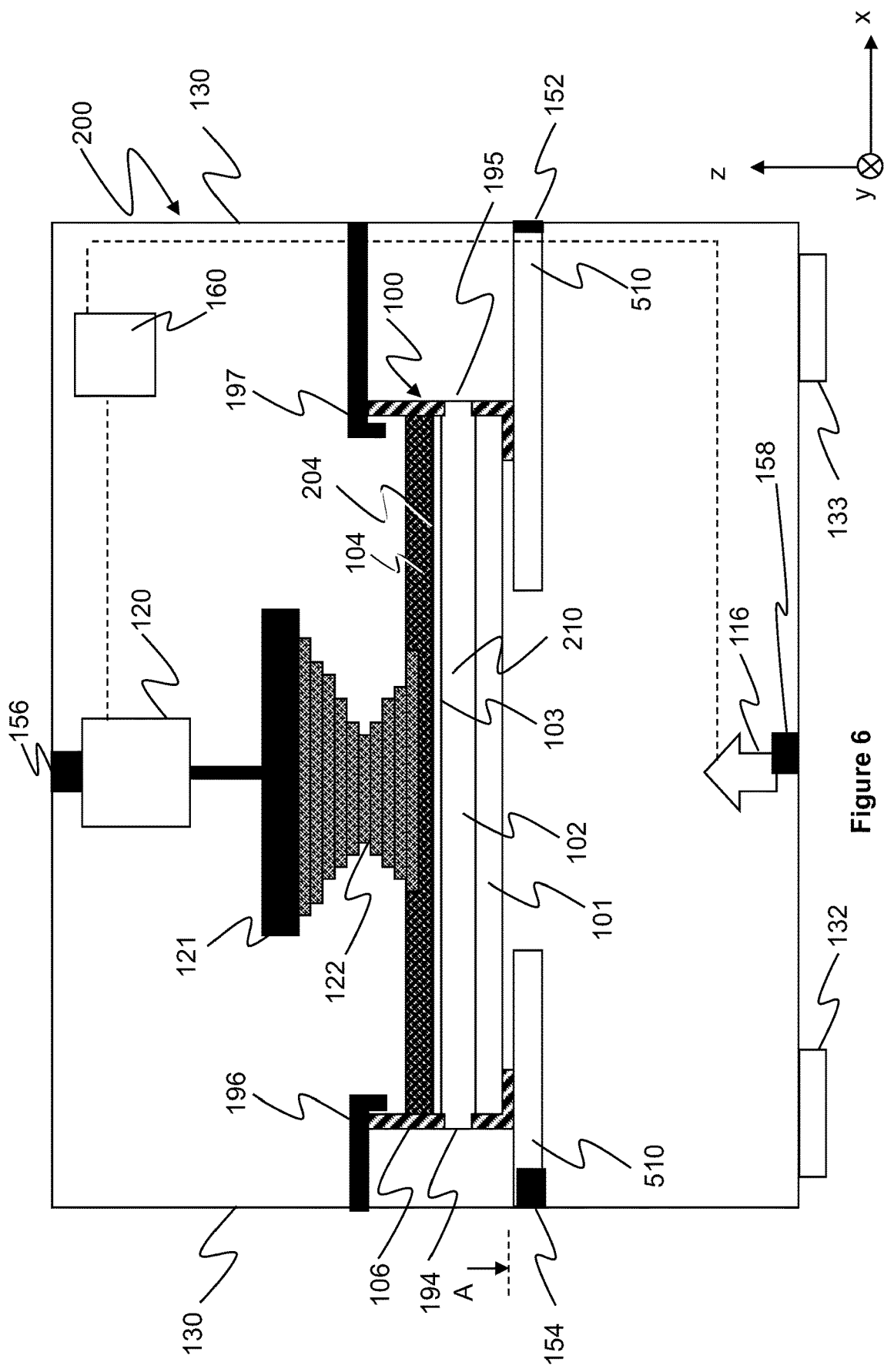

Next, as shown in FIG. 6, positioner 120 lowers the object being made 122 towards the stereolithographic resin receiving surface 204. The object 122 comes to a final position which is substantially, and generally but not necessarily a little more than one section-thickness (say, within 100% of a section thickness) above the stereolithographic resin receiving surface 204.

The thickness of one section is typically in the range of 10 micrometers to 250 micrometers, but it may be less if particularly fine fabrication resolution is required, and greater if a relatively coarse fabrication resolution is required.

Figure 7:
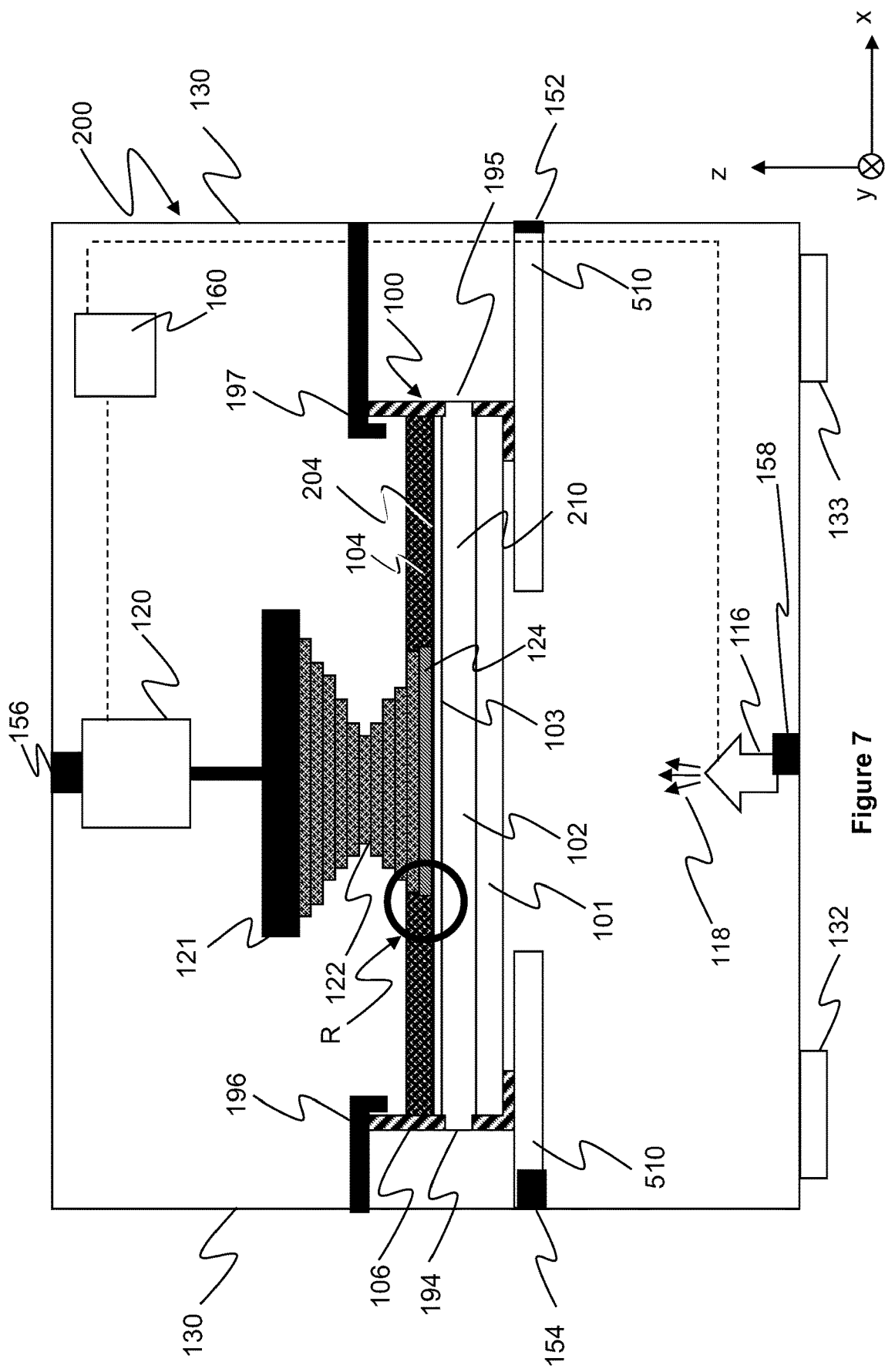
Figure 8:
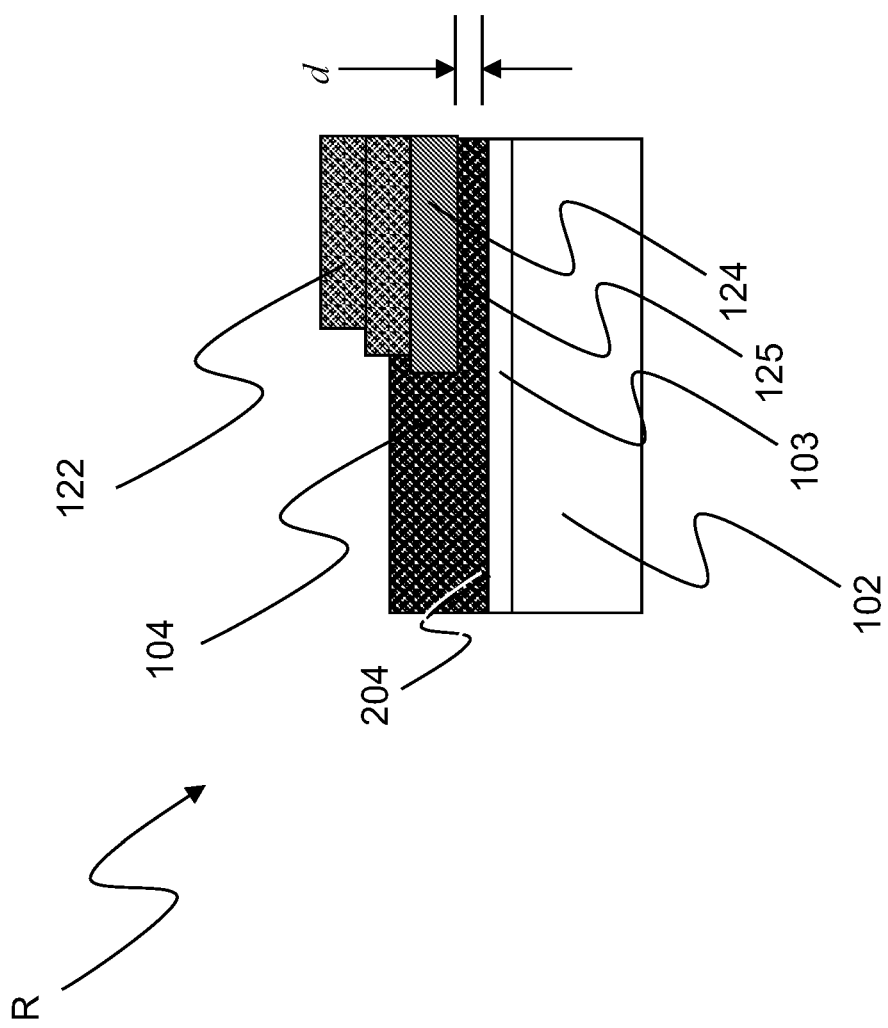
FIG. 8 shows a detail of FIG. 7.

Next, as shown in FIG. 7, light 118 having spatial features in accordance with the sectional geometry of the object being made is emitted from light source 116 and is transmitted through 101 and 210 to selectively harden regions of the layer of stereolithographic resin 104 in contact with the previously formed sections 122 to form a new hardened section 124.

When the concentration of oxygen in a layer of stereolithographic resin at the stereolithographic resin receiving surface 204 is sufficiently high, the polymerization of the layer of stereolithographic resin is inhibited, resulting in a layer of unhardened stereolithographic resin 125 ("uncured stereolithographic resin") in between the hardened layer 124 and the surface 204. FIG. 7 illustrates a highlighted region R which is shown in detail in FIG. 8 wherein the layer of uncured stereolithographic resin 125 has thickness labeled d. In practice, depending on the properties of the stereolithographic resin 104 and the vessel 100, the thicknesses d for a range of stereolithographic resins was measured to be up to 80 µm. The presence of a layer of uncured stereolithographic resin 125 greatly facilitates the separation of the hardened layer 124 away from the surface 204 as presented in the next step.

Figure 9:
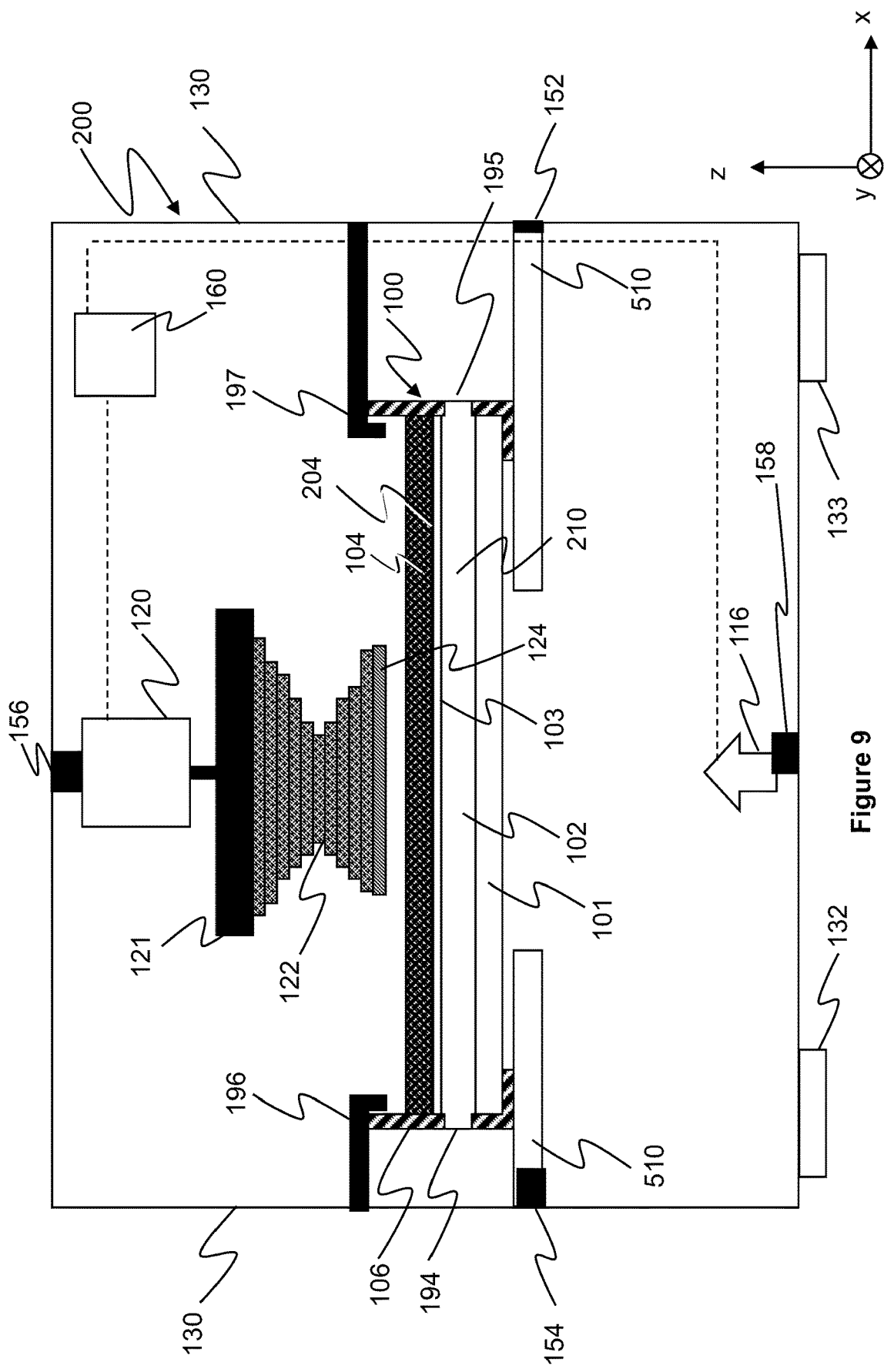

Next, as shown in FIG. 9, mechanical actuator 120 is engaged to raise the previously formed sections 122 and newly formed section 124. As the section 124 is pulled away from the vessel bottom 103, the presence of a layer of uncured stereolithographic resin 125 permits ingress of further stereolithographic resin 104 into the gap to facilitate separation. This ingress of stereolithographic resin 104 prevents vacuum forces from opposing the separation of the section 124 from the vessel bottom 103 and which may generally be applied to the object. In practice a separation distance of around 200 microns may be sufficient for some embodiments. Once the final position is reached, the apparatus 200 is ready for the process to start again. Repeating this sequence of actions enables a multilaminate object to be fabricated section by section.

The presence of the uncured layer of stereolithographic resin 125 significantly reduces the forces during the separation of a formed layer 124 from the vessel 100. In configurations which have no appreciable layer of uncured stereolithographic resin 125, the vessel 100 and newly formed layer 124 form a seal which requires greater separation force to overcome. This greater force may be destructive to delicate objects being fabricated.

A drop of photohardenable resin Freeprint Ortho UV from Detax, Germany, was placed under a glass microscope slide suspended on 200 µm spacers over the experimental vessel. An irradiance 5 mW/cm2 and wavelength 385 nm light source was used to illuminate the underside of the vessel for 4 seconds. The glass microscope slide was removed from the vessel and a spot of cured resin was attached to the glass. Vernier calipers were used to measure the thickness of the cured resin spot to be 170 microns, 30 microns less than the 200 micron space. The layer of uncured stereolithographic resin 125 in this example therefore has a thickness of 30 microns. The stereolithographic resin receiving surface 204 of the experimental vessel (and vessel 100) has a flat configuration. A flat section of consistent thickness may subsequently be formed.

In other embodiments, the stereolithographic resin receiving surface 204 may be configured such that its surface is caused to adopt a configuration other than a flat configuration (e.g. domed). This changes the distribution of the stereolithographic resin accordingly so that the spatial configuration of the stereolithographic resin between the surface 204 and the object is changed or modified to the desired shape. For example, a curved configuration may be advantageous if the object being made has a rounded shape or if the light source 116 projects light 118 to a curved focal plane. It will be understood that the configuration of the upper surface 204 may be any suitable desired geometrical arrangement.

Figure 13:
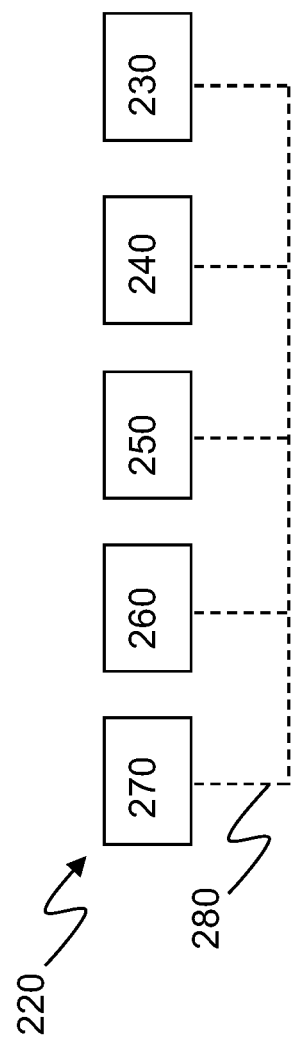
FIG. 13 shows an example architecture of a controller for controlling the devices of the preceding figures.

The positioner 120, the light source 116, and possibly other parts of the apparatus may be in communication with and may be controlled by a controller 160 to coordinate the apparatus to make the stereolithographic object 122. These and other components may be connected by wires, cables, wireless, or any other suitable means. In this embodiment, the controller 160 comprises a processor unit 220, schematically illustrated in FIG. 13. The processor unit 220 may include a suitable logic device 250 such as, or similar to, the INTEL PENTIUM or a suitably configured field programmable gate array (FPGA), connected over a bus 280 to a random access memory 240 of around 100 Mb and a non-volatile memory such as a hard disk drive 260 or solid state non-volatile memory having a capacity of around 1 Gb. The processor has input/output interfaces 270 such as a universal serial bus and a possible human machine interface 230 e.g. mouse, keyboard, display etc. Device components may be controlled using commercially available machine-to-machine interfaces such as LABVIEW software together with associated hardware recommended by the commercial interface provider installed on the processor unit 220, over USB or RS-232 or TCP/IP links, for example. Alternatively, custom driver software may be written for improved performance together with custom printed circuit boards. Alternatively, the processor unit 220 may comprise an embedded system.

In this embodiment, the controller 160 is in communication with another processor which is adapted for determining instructions and/or information for the device. In alternative embodiments, the processors are the same processor. An example of another processing unit comprises a logic device such as, or similar to, the INTEL PENTIUM or a suitably configured field programmable gate array (FPGA), connected over a bus to a random access memory of around 100 Mb and a non-volatile memory of such as a hard disk drive or solid state non-volatile memory having a capacity of around 1 Gb. Generally, the configuration may be similar or identical to that shown in FIG. 13. The processor has a receiver such as a USB port (or Internet connection, for example) for receiving information representing a solid object, stored on a USB FLASH device, for example. The information may be encoded in a file generated by a Computer Aided Design (CAD) program, the information specifying the geometry of the object. The microprocessor runs a decomposer program implementing an algorithm that decomposes (or transforms) the information into data indicative of a plurality of sections to be formed sequentially by the device, the stereolithographic resin being used to make the solid object. The program may have been installed onto the processor from tangible media such as a DVD or USB memory stick, for example, that stored the program. In an alternative embodiment, the decomposer may be a dedicated hardware unit. A series of sections through the object are determined, each section corresponding to a solid section to be formed. The sections may then be further processed to represent the geometry of each section as a rasterised bitmap. The sections or bitmaps may then be used to control the device.

It will be appreciated that embodiments may be used to make an object of generally any shape or size, including jewelry such as rings, prototype car components, microcomponents for precision machines, models for investment casting, and architectural or design features for a building.

Now that embodiments have been described, it will be appreciated that some embodiments may have some of the following advantages:

A layer of uncured stereolithographic resin between the hardened layer and vessel bottom may be achieved without actively feeding oxygen (through concentration by pressure or purification) to the vessel. This may improve the cost and simplicity of the apparatus and may make it more reliable. The layer of uncured stereolithographic resin reduces the separation forces in which case the stereolithographic object being formed has lower risk of damage;

The fabrication is faster because of improved stereolithographic resin flow and reduced separation distances being required;

The vessel bottom wall ameliorates sagging of the oxygen permeable element due to the force of gravity and/or approach or separation forces. This prevents layers of inaccurate thickness or defective layers being formed which may degrade the fidelity of the fabricated stereolithographic objects, thereby improving the quality of the stereolithographic object.

Some embodiments may not require an oxygen concentrator such as a pressure-swing column or external pressurized oxygen cylinder to deliver concentrated or pressurized oxygen to the vessel, nor may not require costly or inconvenient valve connections between an oxygen supply system and the vessel. The cost of the system device may be reduced. The device may require less component connectivity making it more reliable, and the user may not need not pay attention to gas connectors when installing and removing the vessel, making it simpler and more convenient to operate.

It will be appreciated that numerous variations and/or modifications may be made to the invention as shown in the specific embodiments without departing from the spirit or scope of the invention as broadly described. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A vessel for receiving a stereolithographic resin, the vessel comprising:
a casting frame comprising at least one perimeter exterior wall defining a plurality of peripheral gas ports in fluid communication with an atmosphere, the plurality of gas ports extending between opposite sides of the at least one perimeter exterior wall;
an oxygen permeable element comprising a cast oxygen permeable substrate cast within the casting frame and the plurality of gas ports, the oxygen permeable element comprising a stereolithographic resin receiving surface that is an interior vessel surface, the oxygen permeable substrate comprising at least one marginal surface separate from the stereolithographic resin receiving surface, wherein the at least one marginal surface is flush with an external surface of the at least one perimeter exterior wall for passive ingress of oxygen from the atmosphere and transport of the oxygen ingressed to the stereolithographic resin receiving surface to enable formation of a layer of oxygenated stereolithographic resin.

2. A vessel defined by claim 1, wherein the combined area of the at least one marginal surface is greater than at least one of 0.1%, 1%, 2%, 4%, 8%, 16%, and 32% of the area of the stereolithographic resin receiving surface.

3. A vessel defined by claim 1, wherein the combined area of the at least one marginal surface is less than at least one of 0.1%, 1%, 2%, 4%, 8%, 16%, and 32% of the area of the stereolithographic resin receiving surface.

4. A vessel defined by claim 1, wherein the oxygen permeable element has a thickness greater than at least one of 1 mm, 2 mm, 4 mm, 8 mm, 16 mm, 32 mm, 64 mm and 128 mm.

5. A vessel defined by claim 1, wherein the oxygen permeable element has a thickness less than at least one of 1 mm, 2 mm, 4 mm, 8 mm, 16 mm, 32 mm, 64 mm and 128 mm.

6. A vessel defined by claim 1, wherein the oxygen permeable element has a thickness no less than one hundredth of the square root of the area of the stereolithographic resin receiving surface.

7. A vessel defined by claim 1, wherein the oxygen permeable element has a thickness no more than one tenth of the square root of the area of the stereolithographic resin receiving surface.

8. A vessel defined by claim 1, wherein the oxygen permeable element comprises a semipermeable coating at the stereolithographic resin receiving surface.

9. A vessel defined by claim 1, wherein the oxygen permeable element comprises a cast semipermeable coating cast onto the oxygen permeable substrate.

10. A vessel defined by claim 9, wherein the cast semipermeable coating has a thickness in the range of 1 µm to 20 µm.

11. A vessel defined by claim 10, wherein the cast semipermeable coating has a thickness in the range of 5 µm to 10 µm.

12. A vessel defined by claim 9, wherein the cast semipermeable coating has an oxygen permeability of no less than one of 10 Barrer, 30 Barrer, 1000 Barrer, 2000 Barrer and 9000 Barrer.

13. A vessel defined by claim 9, wherein the semipermeable coating has an oxygen permeability of no more than one of 20 Barrer, 50 Barrer, 2000 Barrer, 3000 Barrer and 10 000 Barrer.

14. A vessel defined by claim 1, wherein the oxygen permeable element comprises a semipermeable coating on the oxygen permeable substrate.

15. A vessel defined by claim 1 wherein an exterior vessel surface comprises the at least one marginal surface.

* * * * *